United States Patent [19]

Miyaki et al.

[11] Patent Number: 4,514,304

[45] Date of Patent: Apr. 30, 1985

[54] METHOD FOR PURIFYING AND CONCENTRATING ORGANIC MATTERS

[75] Inventors: Yoshiyuki Miyaki; Yoshitaka Fujita; Kazunori Se; Teruo Fujimoto, all of Nagaoka, Japan

[73] Assignee: Toyo Soda Manufacturing Ltd., Shinnanyo, Japan

[21] Appl. No.: 537,625

[22] Filed: Sep. 30, 1983

[30] Foreign Application Priority Data

Feb. 9, 1983 [JP] Japan .................................. 58-18878

[51] Int. Cl.$^3$ .............................................. B01D 13/00
[52] U.S. Cl. .................................. 210/638; 210/500.2
[58] Field of Search ............... 210/638, 679, 686, 690, 210/692, 500.2, 502.1; 521/27

[56] References Cited

U.S. PATENT DOCUMENTS

| | | | |
|---|---|---|---|
| 4,218,312 | 8/1980 | Perry ................................. | 210/500.2 |
| 4,225,412 | 9/1980 | Reiss ..................................... | 521/27 |
| 4,262,041 | 4/1981 | Eguchi et al. .................... | 210/500.2 |
| 4,360,434 | 11/1982 | Kawaguchi et al. ................. | 521/27 |

OTHER PUBLICATIONS

Polymer Preprints, Japan, vol. 31, No. 10.

*Primary Examiner*—Ivars Cintins
*Attorney, Agent, or Firm*—Armstrong, Nikaido, Marmelstein & Kubovcik

[57] ABSTRACT

A method for purifying and concentrating organic matters by employing an amphoteric ion-exchange membrane which is made of a ternary block copolymer consisting of a macromolecule poly A$^-$ having cation-exchange group, a macromolecule poly B$^+$ having an ion-exchange group and a macromolecule poly C having no ion-exchange group and allows sodium chloride to permeate at a concentration not lower than 100% of that in the starting aqueous solution when a pressure of 50 kg/cm$^2$ is given to the starting aqueous solution of sodium chloride of 0.01 g/dl and by allowing inorganic salts to permeate selectively from an aqueous solution of the organic compounds containing the inorganic salts with giving an increased pressure thereto.

12 Claims, No Drawings

METHOD FOR PURIFYING AND CONCENTRATING ORGANIC MATTERS

DETAILED DESCRIPTION OF THE INVENTION

This invention relates to a method for purifying organic matters by employing an amphoteric ion-exchange membrane consisting of a ternary block copolymer in which a macromolecule poly $A^-$ having cation-exchange group, a macromolecule poly $B^+$ having anion-exchange group and a macromolecule having no ion-exchange group are linked together, and by allowing inorganic salt to permeate selectively from an aqueous solution of the organic compounds containing the inorganic salts.

It has been hitherto and will be in future an important problem for the chemical industry concerned to separate an inorganic salt from organic matters of low molecular weight with lower than some thousands of molecular weight such as saccharides, antibiotics, oligopeptide, coenzyme, vitamin and the like at a low cost. However, the methods of crystallization and those with ion-exchange resins presently carried out necessitate a large consumption of acid, alkali, water, etc., and the electro-dialysis necessitates a large power consumption. Moreover, these methods require a large scale equipment which is troublesome in the operation and the waste fluid treatment. Meanwhile, the methods of ultrafiltration and reverse osmosis are generally impossible to separate these substances each other efficiently.

It has been recently known that, in case of the so-called charge-mosaic membrane in which a domain having a cation exchange group and a domain having an anion exchange group are arranged in a mosaic state, when a salt water is put into contact with the membrane under high pressure, a salt water with a higher concentration than the original one is permeated. Accordingly, if the charge-mosaic membrane is provided with a property to prevent the organic matters with the low molecular weight, it is possible to separate the organic matters with low molecular weight from the inorganic salt. Heretofore, the methods for producing the charge-mosaic membrane have been studied, some of which have succeeded to some extent. (for example, "Desalination" by Yanabe, etc., page 127, Vol. 15-1974; Japan Patent Appln. Kokai Sho 53-18482 by Eguchi and Shimokawa; and Japan Patent Appln. Kokai Sho 54-14389 by Eguchi, Mori and Shimokawa). However, those membrane have not been put to practical use up to now and it is deemed that those membranes are insufficient in a separating function and troublesome in a strength and a mass production.

Among the reports up to now, Eguchi, etc. have indicated a possibility on a separation between saccharides and inorganic salt which has not been known in the other membranes. In particular, when the block copolymer and the polymer blend are used as the raw material, the charge-mosaic membrane forms a microstructure which is inconvenient as the membrane and forms pinholing, cracking, etc. at or after the introduction of the ion-exchange group, and further forms a poly-ion complex which is caused by a rupture of the micro-phase separated structure (refer to the literature of OSW R&DP Report No. 689). Thus, the manufacture of the charge-mosaic membrane has been deemed difficult.

The present inventors have now discovered that by employing an original ternary block copolymer in a straight chain state consisting of a macromolecule introducible with a cation-exchange group, a macromolecule introducible with an anion-exchange group and a macromolecule not introducible with an ion-exchange group and by introducing the cation-and anion-exchange groups with or without cross-linking, an amphoteric ion-exchange membrane which improves the conventional defects accompanied by the block copolymer, can be obtained and further, when thus obtained amphoteric ion-exchange membrane is used in a mixed aqueous solution of organic matters with low molecular weight and inorganic salt, it has removed the inorganic salt only in a higher efficiency than the conventional ion-exchange membrane.

The amphoteric ion-exchange membrane of this invention obtained by utilizing the micro-phase separated structure found in the block copolymer enables us to make a simultaneous desalting and concentration of the organic matter possible at a high efficiency for the first time, and thus opens a way for the industrial utilization of the membrane which is significant.

The method of the invention hereinafter will be described in further detail.

The amphoteric ion-exchange membrane of the invention uses an original block copolymer of linking a macromolecule "poly A" which is capable of introducing a cation-exchange group, a macromolecule "poly B" which is capable of introducing an anion-exchange group and a macromolecule "poly C" which is not introducing any ion-exchange group in a straight chain state, and is made by introducing cation-and anion-exchange groups into the "poly A" portion and the "poly B" portion, respectively, prior or posterior to a molding and by cross-linking the "poly A" portion, the "poly B" portion and the "poly C" portion as required.

In case of the block copolymer, it is generally known that constituent blocks consisting of different monomers are not mingled each other in a solid state but form a microdomain in a globular, stick-like or bounded state at every block which is limited by a length of every block. The amphoteric ion-exchange membrane of the invention features in utilizing the micro-phase separation such as above to make a domain having a cation exchange group and a domain having an anion exchange group exist separately each other.

The original block copolymers of the invention are a tri-block copolymer linked in an arrangement of poly A-poly B-poly C, or poly A-poly C-poly B, or poly B-poly A-poly C; a tetrablock copolymer linked in an arrangement of poly C-poly A-poly B-poly C, poly A-poly C-poly B-poly C, or poly B-poly C-poly A-poly C; and a pentablock copolymer linked in an arrangement of poly C-poly A-poly C-poly B-poly C, poly A-poly B-poly C-poly B-poly A, poly B-poly A-poly C-poly A-poly B, poly A-poly C-poly B-poly C-poly A, or poly B-poly C-poly A-poly C-poly B.

Among the above block copolymers, in order to decrease a formation of a poly-ion complex caused by a mingling of a domain having a cation-exchange group and a domain having an anion-exchange group in an ultimate product, the original copolymer is preferable to have a mode in which the poly A and the poly B are not put side by side and separated by the poly C.

As the block copolymer mentioned above, there are poly A-poly C-poly B, poly A-poly C-poly B-poly C, poly B-poly C-poly A-poly C, poly C-poly A-poly C-poly B-poly C, poly A-poly C-poly B-poly C-poly A, poly B-poly C-poly A-poly C-poly B, etc.

Further in a block copolymer having an arrangement of poly C-poly A-poly C-poly B-poly C, macromolecules poly C are situated at the ends and the poly A and the poly B are separated by the poly C each other. In such a block copolymer, when the poly C portions are cross-linked, the change of micro-phase separated structure is comparatively little even by an introduction of the ion-exchange groups, eventually to obtain a membrane which is excellent in a rejection ratio of organic matters and a permeability of salt.

Among three macromolecules consisting of the original block copolymer used in invention, the macromolecule poly A capable of introducing the cation exchange group is required to introduce a carboxyl group, a sulfone group or a phosphate group easily. Among these groups, the carboxyl group is obtained by hydrolyzing a polymer of unsaturated carboxylic acid esters (for example, acrylic ester, methacrylic ester, crotonic ester, conjugated diene series carboxylic acid ester, ets.); a polymer of monomers containing cyano group or acrylonitrile, methacrylonitrile, vinylidene cyanide, etc.; a polymer of monomers such as alkyldene malonic esters, α-cyanoacrylic ester, etc., and the sulfone group is obtained by hydrolyzing a polymer of styrene sulfonyl chloride or by sulfonating a polymer such as styrene, α-methyl styrene, vinyl toluene, diphenylbutadiene, or the like by the known methods.

The macromolecule poly B capable of introducing the anion-exchange group is required to introduce a functional group such as an ammonium group, a sulfonium group, a phosphonium group or the like. These functional groups are obtained to quarternizing polymers such as vinyl pyridines of vinyl compounds having heterocyclic rings containing nitrogen atoms (2-vinyl pyridine, 4-vinyl pyridine, 2-methyl-5-vinyl pyridine, etc.), vinyl pyrimidines, vinyl quinolines, vinyl carbazoles, vinyl imidazoles, or styrene derivative amines such as o.m.p-vinyl benzylalkylamines or the like represented by the following formula:

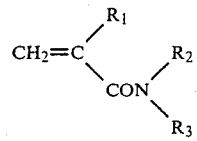

provided that n=1–3; $R_1$ and $R_2$ are respectively an alkyl group having carbon atoms 1–12. Or, it is possible to introduce the functional group by quarternizing polymers such as dialkylaminoethyl acrylates represented by the formula:

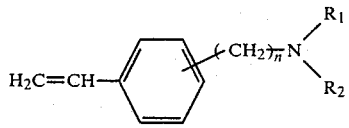

provided that $R_1$ is hydrogen or an alkyl group having carbon atoms 1–12, and $R_2$ and $R_3$ are respectively an alkyl group having carbon atoms 1–12, and dialkyl acrylamides represented by the formula:

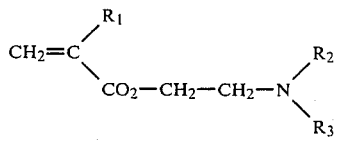

provided that $R_1$ is hydrogen or an alkyl group having carbon atoms 1–12, and $R_2$ and $R_3$ are respectively an alkyl group having carbon 1–12. Further, a quarternary amine can be also introduced easily into polymers of halomethyl styrenes such as chloromethylated styrene by the known methods.

As a monomer consisting of the macromolecule poly C which does not carry the ion-exchange group, diene monomers are suitable, for example, such as butadiene, isoprene, pentadiene, cyclohexadiene, etc.

In case of a block copolymer having a neutral block consisting of such diene monomers, the neutral block portion is easily cross-linked by applying peroxide, sulfur, sulfur monochloride, concentrated sulfuric acid or ultraviolet light by the known methods. Also its hydrogenation is carried out by the conventional methods.

As the result of the above cross-linking, the strength of the material is increased.

The respective molecular weights of the constituent macromolecules poly A, poly B and poly C constituting the block copolymer used in the invention are preferably $10^3$–$10^6$ g/mol and further preferably $10^4$–$5\times10^5$ g/mol. As it is generally known, in the block copolymer, a volume percent of boundary region formed between two adjacent micro domains, which consists of their mixture, increases as the molecular weight decreases. On account of this, in a specimen of a low molecular weight, a poly-ion complex is formed in a large quantity, thereby impairing an effect of a co-existence of a cation domain and an anion domain due to the micro-phase separation.

According to the experimental results hitherto published for the various block copolymers, not more than $10^3$ of molecular weight for each block is deemed little permitted to form a phase separated structure. Whereas, in case of a specimen with a large molecular weight, a viscosity thereof increases in a solid or solution state and it results in a possible difficulty of molding.

The original block copolymer is required to contain not less than 5% by weight respectively of one constituent macromolecule poly A which introduces a cation-exchange group and another constituent macromolecule poly B which introduces an anion-exchange group. It is because, when the constituent segments having cation-exchange group or anion-exhange group of an amphoteric ion-exchange membrane eventually obtained have become under 5%, an effect on a co-existence of amphoteric ions is remarkably reduced. Further, a neutral constituent macromolecule poly C is preferably contained not less than 30% by weight for the purpose of a strength of the membrane and separating the poly A and poly B portions separated on a micro-phase separated structure.

The block copolymer used in the invention is produced by a method of a living anion polymerization. The method permits to obtain a block copolymer uniform in the polymerization degree.

As an initiator for the living anion polymerization, butyl lithium (there are n-, sec-, tert-, etc.) and 2- methylbutyl lithium or sodium naphthalene, sodium anthracene, α-methyl styrene tetramer sodium, sodium biphenyl, etc. which are conventional are used and a polymerization is carried out under vacuum or under an inert gas such as nitrogen gas, argon gas, etc. in aromatic hydrocarbon, cyclic ester or aliphatic hydrocarbon (generally, tolune, tetrahydrofuran, n-hexane, cyclohexane, etc. are used).

A film of the original block copolymer is made easily by a solvent evaporation method. In this case, many organic solvents such as benzene, toluene, xylene, cyclohexane, dioxane, tetrahydrofuran, chloroform, dichloroethane, etc. are usable. The film can be used of oneself but may be superposed on a suitable porous supporting membrane.

The porous supporting membrane mentioned above is preferable to be made of polyvinylchloride, polyacrylonitrile, teflon, polyethylene, polypropylene and glass, and a block copolymer membrane can be made approximately up to a thickness of 0.1–5 μm. By making the block copolymer membrane thin as aforementioned, a velocity of permeation of the amphoteric ion-exchange membrane eventually obtained is increased. The amphoteric ion-exchange membrane can be obtained by a process of converting a nitrogen portion of the original block copolymer to a quaternary or tertiary ammonium salt after or prior to or during a production process of a membrane from the original block copolymer and subsequently by carrying out cross-linking, hydrogenation, sulfonation, hydrolysis, etc. after production of membrane, if the process is prior to the production. The quaternization of nitrogen is carried out by a conventional method of reacting with alkyl halide and can be carried out at the same time with the production of membrane if a solvent containing the alkyl halide is used. The halomethyl styrene is converted to a quaternary amine with trimethylamine, etc. Further, the nitrogen portion can be converted to a tertiary ammonium salt with hydrochloric acid, etc. The sulfonation of the aromatic rings is carried out with concentrated sulfuric acid, fuming sulfuric acid, sulfur trichloride, chlorosulfonic acid, etc. (refer to p-1776, Vol. 14-III of New Experimental Chemistry Lecture) and the hydrolsis of the carboxylic acid ester is carried out with an aqueous solution of sodium hydroxide, etc. by conventional methods.

Still more, in order to obtain a finer membrane by controlling a swelling with water on the portions having the ion-exchange groups, these portions should be cross-linked.

The cross-linking of the portions having cation-exchange group is carried out to react with a portion having aromatic rings such as poly styrene, etc., a compound having n not less than 2 represented by $Cl(CH_2)nCl$, and the like by applying Friedelcrafts catalyst (for example, $AlCl_3$, $SbCl_5$, $SnCl_4$, etc.), and the cross-linking of the portions having anion-exchange group is carried out to quaternizing the nitrogen portion by applying a compound having n of not less than 2 represented by, for example, $Br(CH_2)n$ Sr and $I(CH_2)n$ I.

Where, as explained above, the beforesaid block copolymer is used as the raw material, it is possible to add a chemical modification hereto with maintaining the micro-phase separation structure which has been formed initially and the amphoteric ion exchange membrane which is minute and free of defects can be finally obtained. Practically, as a result of measuring anion- and cation-exchange capacities of the membrane like this independently, they can amount to more than 0.3 miliequivalent per 1 g of the dried resin respectively, and therefore it is ascertained that anion-and cation-exchange regions coexist.

The inventors found that thus obtained membrane is useful to remove inorganic salts from a mixed aqueous solution of organic matters having low molecular weight or high molecular weight and the inorganic salts with high efficiency. The organic matters having low molecular weight are here defined as saccharides such as glucose, fructose, maltose, xylose, saccharose, raffiuose, etc., vitamins, various kinds of oligopeptides, antibiotics, food additives, coenzymes, medicines, opices, and others known as the general chemicals, synthetic substances, biochemicals, etc.

The organic matters having high molecular weight are various kinds of macromolecular polysaccharides including starch as a typical one, various kinds of proteins and water soluble macromolecules such as polyvinyl alcohol, polyethylene glycol, polyvinyl pyrrolidone and so on. In case a method of this invention is practiced with use of the membrane wherein portions having ion-exchange group are not subjected to cross-linking, organic matter capable of being purified and concentrated are preferably non-electrolytic and have their molecular weights of more than 100 g/mol and further preferably more than 500 g/mol. The reason is that, in case of electrolytes or ones of low molecular weight, leakage of the membrane tends to become remarkable, thereby deteriorating efficiency of purification and concentration. When the portions having ion-exchange group are subjected to cross-linking, the most suitable membrane can be selected to be used in accordance with the object of the use, since the molecular weight of excludable limitation is lowered and then the concentration ratio of salt is increased.

In the method of this invention, the purification and concentration of organic matters are carried out by giving an increased pressure to the starting solution side containing inorganic salts and organic matters, but the pressure given at this time is necessary to be more than the osmotic pressure $\pi$ resulted between both face of the membrane due to difference in the concentrations of organic matters. It is known that this osmotic pressure $\pi$ is approximately defined by the following equation (1).

$$\pi = (mRT)/V_w° \qquad (1)$$

m: weight molar concentration of i-th species of organic compounds
$v_w°$: molar volume of water
R: gas constant
T: absolute temperature Accordingly, the higher the concentration of the contained organic matter is, the higher pressure is required and then the flow of water and inorganic salt through the membrane hardly come to arise in case of a pressure less than said pressure. Also, in case the starting solution contains organic compounds renumbering to n, there is required a pressure more than the osmotic pressure $\pi$ calculated by replacing m of the equation (1) with $$\sum_{i=1}^{n} mi$$

(mi is the weight molar concentration of i-th species of organic matter). In the present method, the amphoteric ion-exchange membrane is used so that one face thereof may contact with the starting solution and another face thereof may contact with the permeated solution. At this time, there is used a membrane by which the concentration of sodium chloride in the permeated solution becomes more than 100% of that in the starting solution, in case the concentration of sodium chloride in the starting solution is 0.01 g/dl and a pressure of 50 kg/cm² is given thereto. The enrichment (the definition thereof is mentioned later) of sodium chloride is further increased with lowering the concentration of sodium chloride in the starting solution side or with increase of the pressure. Also, in case the pressure is amply higher than value of $\pi$ calculated by the equation (1), the enrichment is scarcely affected by the concentration of organic matter in the starting solution.

Hereinafter, this invention is explained by example.

The rejection (%) and enrichment (%) appeared in examples are defined by the following equations.

$$\text{rejection (\%)} = \left(1 - \frac{\text{concentration of permeated solution}}{\text{concentration of starting solution}}\right) \times 100$$

$$\text{enrichment (\%)} = -(\text{rejection})$$

EXAMPLE 1

Into benzene purified through a sodium mirror, using $3.4 \times 10^{-4}$ mol of sec-butyl lithium as an initiator, styrene, 4-vinylbenzyl-dimethylamine (hereafter abbreviated to 4-VBDMA) and isoprene were introduced in the order of 7 g of isoprene, 15 g of styrene, 7 g of isoprene, 25 g of 4-VBDMA and 7 g of isoprene by a five state sequential addition and were polymerized to give an original block copolymer of poly C-poly A-poly C-poly B-poly C type. Prior to the polymerization, styrene was dried over calcium hydride, subjected to a reduced distillation and thereafter it was further purified with sodium benzophenone, subjected to a vacuum distillation. Isoprene was distilled after dried over calcium hydride and sodium. 4-VBDMA was dried over calcium hydride, subjected to a reduced distillation and thereafter it was further purified with a combination of triphenylmethyllithium-lithium bromide, subjected to a vacuum distillation. The yield of this polymerization is almost 100%, and GPC elution curve and super-centrifuged sedimentation pattern of the obtained sample showed a simple peak respectively. These facts indicate that the polymerization was carried out as scheduled and, as the result, a sample having uniform polymerization degree was obtained. Using 5 wt.% of benzene solution of this obtained original block copolymer, an original film of about 50 μm in thickness was prepared on mercury by the method of evaporating solvent. This original film was made quarternary in the amine portion thereof in vapor of methyl iodide, further cross-linked in the isoprene portion thereof with 20 volume % nitromethane solution of sulfur chloride and thereafter further sulfonated in the styrene portion thereof with 2% chloroform solution of chlorosulfonic acid.

As a result of observing the film by a transmission electron microscope at every step of these chemical treatments respectively, it was clear that three phases microstructure of the original film was maintained without any essential change to the end. Also, the cation exchanging capacity of the finally obtained membrane was 0.95 mili-equivalent per 1 g of the dried resin, and the anion exchanging capacity thereof was 0.60 mili-equivalent.

As a result of performing a piezo-dialysis experiment on sodium chloride aqueous solution with using this amphoteric ion-exchange membrane under a pressure of 50 kg/cm², the concentration of permeated solutions became 0.018 g/dl, 0.13 g/dl and 1.05 g/dl respectively to 0.01 g/dl, 0.1 g/dl and 1 g/dl of the sodium chloride concentrations of the starting solution, and therefore the concentrating effect of salt was recognized. The flow rate of the aqueous solutions of sodium chloride was about 0.3 cm/hour at every concentration thereof.

EXAMPLE 2

Employing the amphoteric ion exchange membrane obtained by example 1, a piezo-dialysis experiment of an aqueous solution containing raffinose and sodium chloride was carried out under a pressure of 50 kg/cm².

Setting the concentration of raffinose in the starting solution to 2 g/dl and the concentration of sodium chloride therein to 0.01 g/dl respectively, the rejection of raffinose was about 90% and the enrichment of sodium chloride was about 80%. Also, setting the concentration of sodium chloride to 1% with the concentration of raffinose unchanged, the rejection of raffinose was about 90% and the enrichment of sodium chloride was about 5%.

EXAMPLE 3

Employing the amphoteric ion exchange membrane obtained by example 1, a piezo-dialysis experiment of an aqueous solution containing saccharose and sodium chloride was carried out under a pressure of 50 kg/cm². Setting the concentration of saccharose in the original liquid to 0.2 g/dl and the concentration of sodium chloride to 0.01 g/dl, the rejection of saccharose was about 70%, the enrichment of sodium chloride was about 100% and the flow rate was about 0.3 cm/hour. Also, setting the concentration of saccharose in the starting liquid to 10 g/dl with the concentration of sodium chloride therein unchanged, the rejection of saccharose became about 75%, the enrichment of sodium chloride about 50% and the flow rate about 0.15 cm/hour.

EXAMPLE 4

Employing the amphoteric ion exchange membrane obtained by example 1, piezo-dialysis experiment of an aqueous solution containing dextrin having weight-averaged molecular weight of approximately 5000 g/mol and sodium chloride was carried out under a pressure of 30 kg/cm². Setting the concentration of dextrin in the starting solution to 2 g/dl and that of sodium chloride to 0.1 g/dl respectively, the rejection of dextrin is about 97%, the enrichment of sodium chloride is about 30% and the flow rate is about 0.2 cm/hour. Further, it was recognized that, when the piezo-dialysis experiment was continued as such and just half volume of the original liquid was subjected to permeation, the remained solution contained about 90% of dextrin contained in the starting solution and more than 90% of sodium chloride was excluded.

EXAMPLE 5

At the time of preparing the original block copolymer, the polymerization was carried out in the same manner as in example 1, except employing the initiator being $1.5 \times 10^4$ mol, to obtain a sample having a molecular weight being about 2.3 times of that obtained in example 1.

The original film of about 50μ in thickness, which was obtained by casting 5 wt% cyclohexane solution of this original block copolymer, was treated in the same way as in example 1 to give an amphoteric ion exchange membrane.

The cation-and anion-exchanging capacities of this membrane were 0.80 mili-equivalent and 0.40 mili-equivalent per 1 g of the dried resin respectively.

As a result of performing piezo-dialysis experiment by using this amphoteric ion exchange membrane, the enrichment of sodium chloride was 50%, in case the concentration of that in the starting solution was 0.01 g/dl.

Employing the obtained amphoteric ion exchange membrane, a piezo-dialysis experiment of an aqueous solution containing raffinose and sodium sulfate was carried out under a pressure of 80 dg/cm². Setting the concentration of raffinose in the original liquid to 2 g/dl and the concentration of sodium sulfate to 0.01 g/dl respectively, the rejection of raffinose was 93%, the enrichment of sodium sulfate was about 30% and the flow rate was about 0.25 cm/hour.

EXAMPLE 6

Employing the amphoteric ion exchange membrane obtained in example 5, a piezo-dialysis experiment of an aqueous solution containing 1% of vitamin B12 and 0.1% of sodium chloride respectively was carried out under a pressure of 50 kg/cm². As this result, the rejection of vitamin B12 was 95%, the concentration ratio of sodium chloride was about 30% and the flow rate was about 0.25 cm/hour.

EXAMPLE 7

Making the amine portion quarternary with 1.3-diiodopropane and cross-linking the styrene portion with a complex of ($AlCl_3$ and ether) and 1.2-dichloroethane by the conventional method prior to sulfonation of said styrene portion in example 1, an amphoteric ion exchange membrane was obtained. As a result of performing piezo-dialysis experiments of the same system as in example 2 and 3 by using this membrane, the rejection of raffinose and saccharose were 97% and 92% respectively and the enrichment of sodium chloride was about 250% in any case, when the concentration of sodium chloride in the starting solution was 0.01 g/dl. In case the saccharose was absent, there was also no change in the enrichment of sodium chloride.

EXAMPLE 8

Dissolving the original block copolymer obtained in example 1 into dioxane and coating the resulted solution on a porous supporting membrane of polyvinylchloride, a membrane of about 0.5 μm in thickness was formed. To this composite membrane, the same chemical treatments as in example 1 were carried out and the introduction of ion exchange group and the cross-linking were practiced. As a result of performing a piezo-dialysis experiment of an aqueous solution containing 2 g/dl of saccharose and 0.01 g/dl of sodium chloride with use of the resulted membrane under a pressure of 50 kg/cm², the rejection of saccharose and the enrichment of sodium chloride were 90% and 70% respectively and the flow rate was about 3.5 cm/hour.

What is claimed is:

1. In a method for purifying and concentrating organic matters containing inorganic salts, the improvement comprising (a) employing an amphoteric ion-exchange membrane which is made of a ternary block copolymer consisting of a macromolecule poly $A^-$ having cation-exchange group, a macromolecule poly $B^+$ having an ion-exchange group and a macromolecule poly C having no ion-exchange group, said amphoteric ion-exchange membrane characterized in that it allows sodium chloride to permeate at a concentration not lower than 100% of that in a starting aqueous solution when a pressure of 50 kg/cm² is given to a starting aqueous solution of sodium chloride of 0.01 g/dl concentration, and (b) by allowing inorganic salts to selectively permeate from an aqueous solution of the organic compounds containing the inorganic salts through the membrane by applying an increased pressure thereto.

2. The method for purifying and concentrating organic matters recited in claim 1 wherein the amphoteric ion-exchange membrane is made of the ternary block copolymer in which the macromolecule poly $A^-$ having cation exchange group and the macromolecule poly $B^+$ having anion-exchange group are linked so that they may not be adjacent each other by the macromolecule poly C being included between them.

3. The method for purifying and concentrating organic matters recited in claim 1, wherein the amphoteric ion exchange membrane is obtained by introducing cation-exchange group and anion-exchange group into an original block copolymer in which components of macromolecule consisting of a macromolecule poly A capable of introducing cation-exchange group, a macromolecule poly B capable of introducing anion-exchange group and a macromolecule poly C incapable of introducing the ion-exchange groups, are linked in a straight chain.

4. The method for purifying and concentrating organic matters recited in claim 3, wherein the macromolecule poly A capable of introducing cation-exchange group and the macromolecule poly B capable of introducing anion-exchange group are linked, being separated by the macromolecule poly C incapable of introducing the ion exchange groups so that they may not be adjacent each other.

5. The method for purifying and concentrating organic matters recited in claim 1, wherein the portion of the macromolecule poly C having no ion-exchange group in the amphoteric ion exchange membrane is cross-linked.

6. The method for purifying and concentrating organic matters recited in claim 1, wherein the portion of the macromolecule poly $A^-$ having cation-exchange group in the amphoteric ion-exchange membrane is cross-linked.

7. The method for purifying and concentrating organic matters recited in claim 1, wherein the portion of the macromolecule poly $B^+$ having anion-exchange group in the amphoteric ion-exchange membrane is cross-linked.

8. The method for purifying and concentrating organic matters recited in claim 1, wherein the amphoteric ion-exchange membrane is employed in a state of being joined on a porous supporting membrane.

9. The method for purifying and concentrating organic matters recited in claim 1, wherein the amphoteric ion-exchange membrane is 0.1 μm–5 μm in thickness.

10. The method for purifying and concentrating organic matters recited in claim 1, wherein one face of the amphoteric ion-exchange membrane is in contact with the starting solution under a high pressure and another face thereof is in contact with the permeated solution under a low pressure at the time of selective permeation of the inorganic salt.

11. The method for purifying and concentrating organic matters recited in claim 1, wherein the pressure applied to the starting liquid is higher than the pressure of $\pi$ represented by the following equation:

$$\pi = \frac{RT \sum_{i=1}^{n} mi}{V_w^\circ}$$

mi: weight molar concentration of i-th species of organic compounds
$V_w^\circ$: molar volume of water
R: gas constant
T: absolute temperature
n: number of kinds of organic compounds in aqueous solution thereof.

12. The method for purifying and concentrating organic matters recited in claim 1, wherein the organic compound is a non-electrolyte having a molecular weight of more than $10^2$ g/mol.

* * * * *